United States Patent [19]

Murakami et al.

[11] Patent Number: 4,465,355
[45] Date of Patent: Aug. 14, 1984

[54] SINGLE-LENS REFLEX CAMERA

[75] Inventors: Hiroyasu Murakami, Tokyo; Akira Hiramatsu; Makoto Katsuma, both of Kanagawa, all of Japan

[73] Assignee: Canon Kabushiki Kaisha, Tokyo, Japan

[21] Appl. No.: 429,521

[22] Filed: Sep. 30, 1982

[30] Foreign Application Priority Data

Oct. 9, 1981 [JP] Japan ............................. 56-161888
Dec. 22, 1981 [JP] Japan ............................. 56-206130

[51] Int. Cl.$^3$ .......................................... G03B 17/18
[52] U.S. Cl. ................................... 354/475; 354/483
[58] Field of Search ............. 354/53, 60 E, 289, 472, 354/475, 483

[56] References Cited

U.S. PATENT DOCUMENTS 4,140,378  2/1979  Suzuki et al. .................. 354/53
4,290,686  9/1981  Suzuki et al. .................. 354/53
4,299,462 11/1981  Suzuki et al. .................. 354/53

Primary Examiner—Russell E. Adams
Attorney, Agent, or Firm—Toren, McGeady and Stanger

[57] ABSTRACT

In the camera disclosed, a display device adapted for displaying photographic information and a pattern, etc., with a liquid crystal within the camera view finder, a polarizing arrangement which creates a contrast between a portion of the display and another is combined with the liquid crystal. This produces a display with a high contrast portion and a low contrast portion.

5 Claims, 9 Drawing Figures

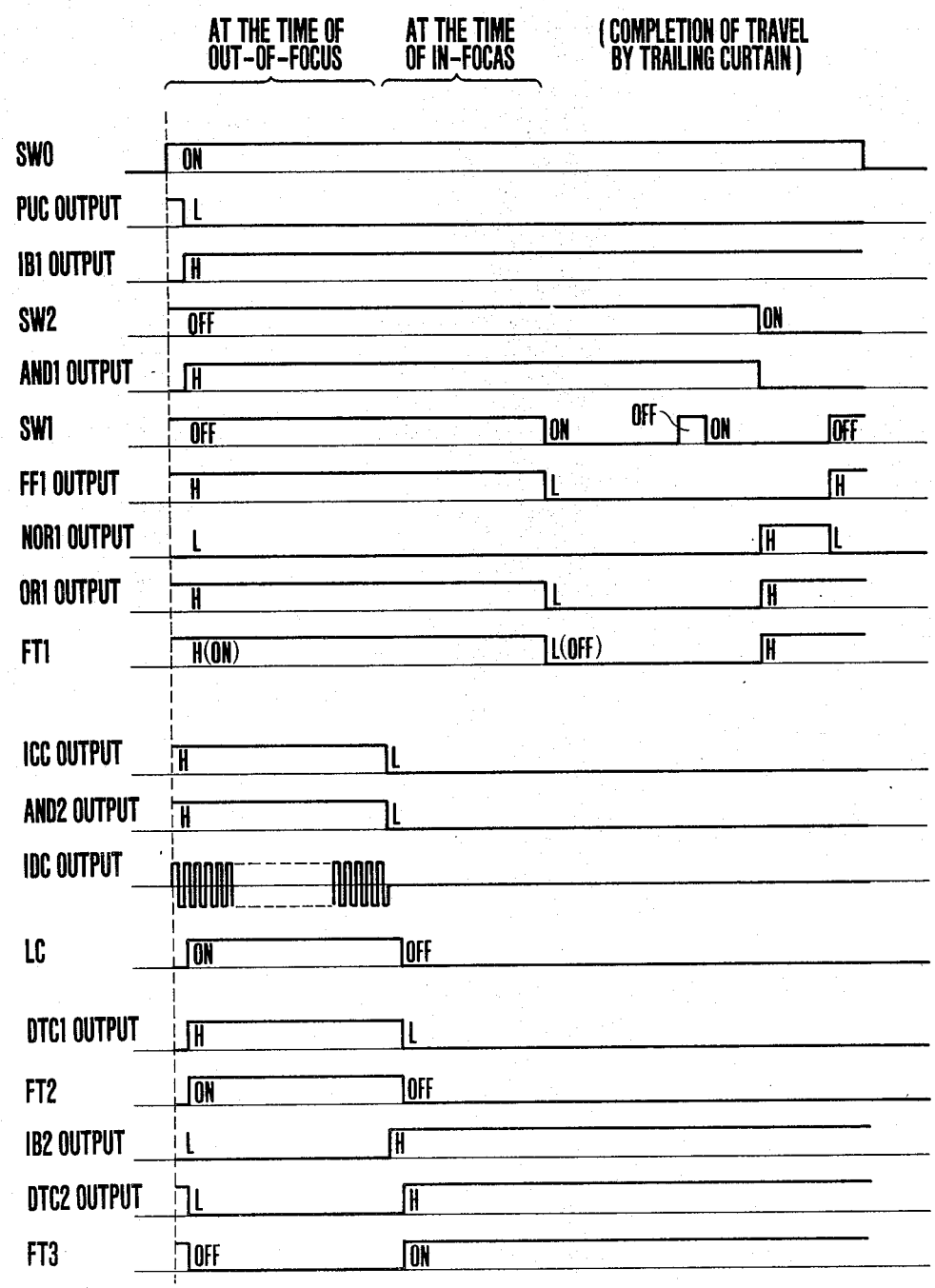

SINGLE-LENS REFLEX CAMERA

BACKGROUND OF THE INVENTION

1. Field of the Invention

This invention relates to a single-lens reflex camera with a display for displaying information of various kinds within the view finder of the camera, and particularly to a single-lens reflex camera arranged to display letters, patterns, etc. by means of a liquid crystal within or outside the visual field frame of a view finder.

2. Description of the Prior Art

Heretofore various view finder display devices have been proposed for single-lens reflex cameras such proposals include devices of the type arranged to display photographic information with a liquid crystal outside of the visual field frame of a view finder. Another type uses a liquid crystal disposed covering the optical path of a view finder and arranged to superimpose letters, patterns, etc. on the view field. The liquid crystals are of the light transmission type. In many cases, T.N. cells, etc., that utilize the torsional effect of a nematic liquid crystal have been employed for this purpose. In addition, it has recently become known that a G.H. liquid crystal which as a guest-hose effect is also usable for displays. Such a crystal uses various kinds of dyestuff molecules as guest and liquid crystal molecules as host to obtain the rotatory orientation of the dyestuff molecules.

In displaying various kinds of information in a pattern within the view finder of a camera using a T.N. liquid crystal plate or a G.H. liquid crystal plate, a portion of the display pattern maybe located within the visual field frame of the view finder and a portion of the display pattern maybe located outside of the visual field frame are both arranged for display by a single liquid crystal plate. In that case the portion of the display pattern located outside the visual field frame must have a high contrast while the portion which is located within the visual field frame and which is a superimposed display does not have to have a high contrast. In view of this, the liquid crystal display plate must be arranged to meet this requirement. Assuming that a display is to be placed within a view finder, such as mentioned, using a guest-host type liquid crystal, an ordinary polarizing plate must be used for obtaining the sufficient contrast required for the display portion outside of the visual field frame even with a G.H. type liquid crystal. Using the polarizing plate results in obtaining only 50% of the oncoming light even if the polarizing plate is ideal. This inevitably darkens the visual field of the view finder. If a G.H. liquid crystal plate is used alone without the polarizing plate to avoid this lightless, the display portion outside the visual field frame is not readily visible due to the insufficient contrast although the display portion within the frame may be readily visible.

Further, in a electric light shielding element. This is for the following reason. If the light reaches the light shielding element before it passes to the light measuring element, the quantity of light received at the light measuring element when information is displayed by the photo-electric light shielding element differs from the quantity of light received when no information is displayed by the light shielding element. To avoid such variation in the quantity of light, light has heretofore been guided to the light measuring element in the following manner:

(1) A half-mirror is arranged in front of the photo-electric light shielding element to guide the light flux to the light measuring element.

(2) A half-mirror is disposed at the 45° mirror and the light flux is guided through the sub-mirror to the light measuring element.

The above conventional arrangement, however has the following shortcomings:

(1) It is impossible to measure the light after the light has passed through the photo-electric light shielding element. Therefore, the arrangement allows little latitude in determining the position of the light measuring element. It has been thus impossible to perform a light measurement at the pentagonal optical system of a camera. In the case of a camera of the type having an in-focus detector and capable of automatic focusing to effect an in-focus display, an in-focus detecting element is often disposed below a 45° reflecting mirror. In such a case, the positional restriction imposed on the arrangement of the light measuring element becomes more severe.

(2) Since the light flux is guided to the light measuring element before it is guided to the view finder optical system, the view finder is always dark.

To eliminate the disadvantages, it is possible to perform the light measurement and the display in a time sharing manner by means of a timing signal and to arrange the photo-electric light shielding element at a stage preceding the light measuring element. However, where a slow responsive photo-electric light shielding element such as a liquid crystal (LC) or an electrochloric cell (EC) is used in such an arrangement, the time sharing period inevitably becomes long and results in undesirable flickering of the displayed information.

SUMMARY OF THE INVENTION

It is an object of the invention to provide a single-lens reflex camera which eliminates the above stated shortcomings of conventional camera with polarizing means arranged in combination with a liquid crystal to afford contrast between one portion and another of a display made within a view finder such that the display includes light shielding element in a light shielding condition to another light measurement reference level when the light shielding element is not in the light shielding condition.

These and further objects and features of the invention will become apparent from the following detailed description of preferred embodiments thereof taken in connection with the accompanying drawings.

BRIEF DESCRIPTION OF THE DRAWINGS

FIG. 8 is a timing chart showing the operation of the circuit shown in FIG. 7.

DETAILED DESCRIPTION OF PREFERRED EMBODIMENTS

Figure 1:
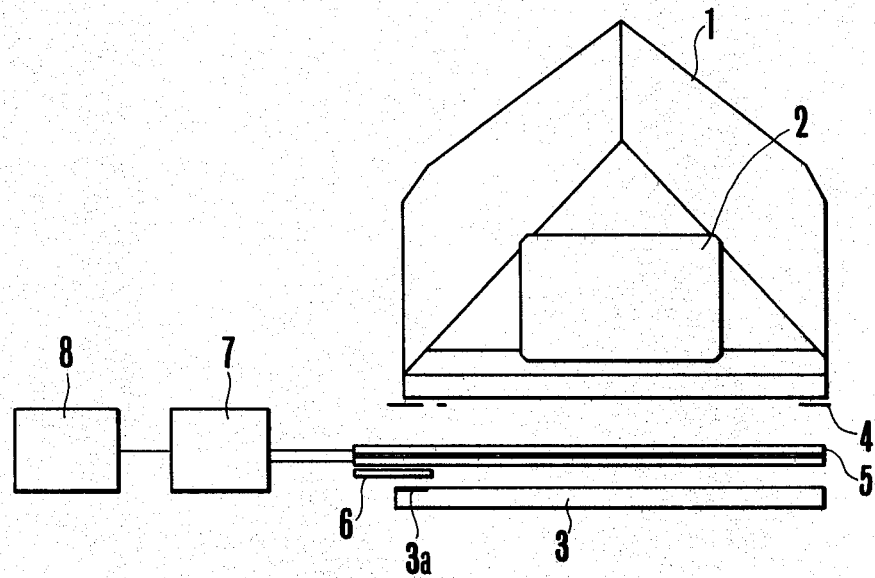
FIG. 1 is a schematic view showing the structural arrangement of a display device disposed within a view finder embodying the invention.

FIG. 1 shows a display device disposed within a view finder as an embodiment of the invention. The embodiment includes a penta-prism 1; an eye-piece 2; and a reticle 3 disposed below the penta-prism 1. The reticle 3 has its lower side formed as a Fresnel lens, and a portion 3a of a diffuse focus surface on its upper side is arranged as a transmission face to brighten a display portion outside of a visual field frame 4. The visual field frame 4 is disposed between the penta-prism 1 and the reticle 3 and has an aperture 28 forming a photographic visual field and another aperture 29 forming an information display therein. A guest-hose type liquid crystal plate 5 is interposed in between the visual field frame 4 and the reticle 3. A polarizing plate 6 is disposed at a position corresponding to the information display aperture 29 between the reticle 3 and the liquid crystal plate 5. The system includes liquid crystal driving circuit 7 and a detecting, computing and control circuit 8 which services to effect an exposure, distance measurement, etc.

Figure 2A:
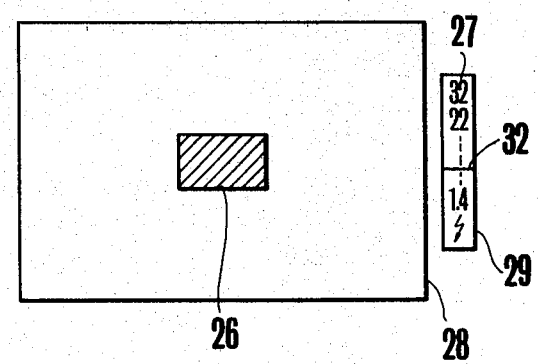
FIG. 2(a) is a schematic view showing the visual field of the view finder of FIG. 1 in a display state representing an out-of-focus condition.

FIGS. 2(a) and (b) show the visual field of the view finder. The visual field includes a distance measurement area mark pattern 26 which is a superimposed display pattern. Provided within the view finder is an aperture value display pattern 27 which is disposed outside the visual frame of the view finder and has an exposure indication mark 32 arranged therein. While the display within the visual field does not require much contrast, a high contrast is required for the display outside the visual field frame of the view finder. For this purpose, the polarizing plate 6 is arranged at a position to enable only the information display portion 27 of the guest-host type liquid crystal plate 5 as shown in FIG. 1 so as to form a display with a high degree of contrast. To prevent the end face of the polarizing plate 6 from being seen within the view finder, light therefrom is blocked by the visual field frame 4. Such being the arrangement of the display device, the display with the photographic visual field frame is kept fairly bright without being affected much by the low contrast superimposed display, while the high contrast display outside the visual field frame is sharply visible.

Light passing through the light transmission face 3a of the reticle 3 corresponding to the information display aperture 29 passes through the polarizing plate 6 and the G.H. liquid crystal plate 5. The light also comes through the information display aperture 29 and is visible by the photographer through the penta-prism and the eye-piece 2. In that instance, the information display might not readily be visible if an object to be photographed is too dark. On such occasion, a known illumination device or an external light source may be used to brighten the object. An image of the object formed on the diffuse focal plane corresponding to the photographic observation aperture 28 of the reticle 3 is projected from the eye-piece 2 through the view finder optical system with a suitably contrasting display superimposed thereon to enable the photographer to see the superimposition of the finder image and the display pattern.

Figure 3:
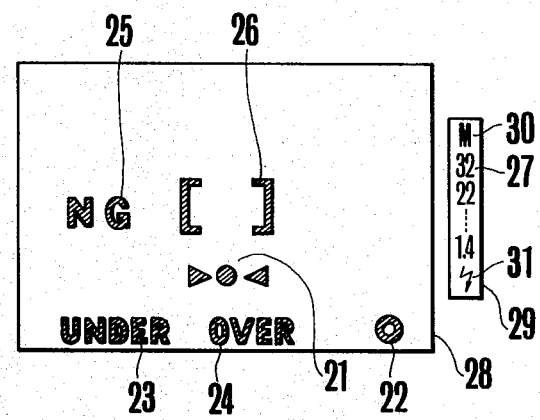
FIG. 3 is a schematic illustration showing another example of the visual field of the view finder shown in FIG. 2(a).

FIG. 3 shows another example of the display pattern to be made within the view finder. In this case, the display pattern within the view finder visual field frame includes a distance measuring area mark 26; a distance measurement indication 21 having a mark o to indicate an in-focus condition and marks to indicate near-focus and far-focus conditions respectively; an exposure correction mark 22; warnings 23 and 24 against deviation from an interrelated operation range; and a warning pattern 25 informing the photographer of the impossibility of release and disabling of the operation. Meanwhile, the information display pattern outside the photographing visual field frame consists of a mark M 30 which is provided for indicating a manual operation; aperture values 27; a mark 31 which is provided for indicating completion of a charging process of a flash light device; etc.

Figure 4:
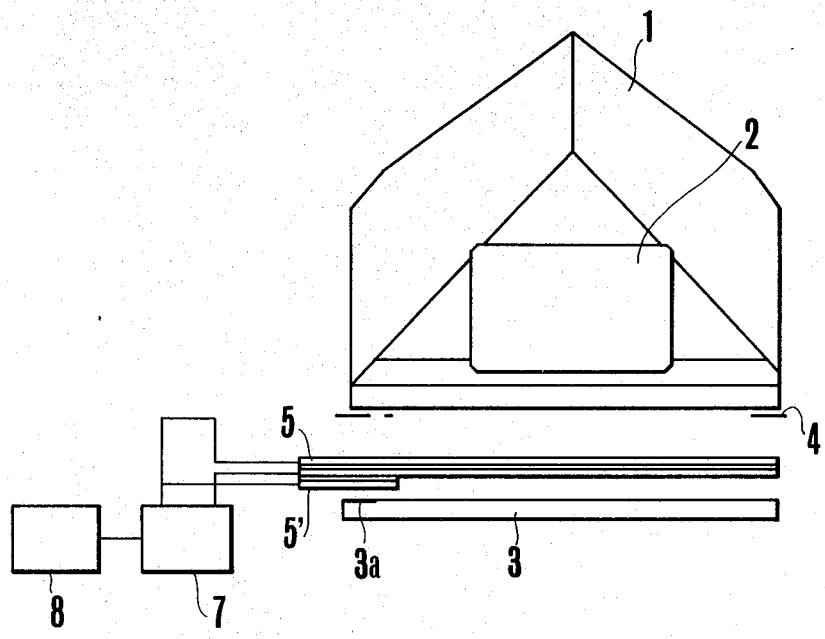
FIG. 4 is a schematic view showing a modification example of the structural arrangement of the view finder display device shown in FIG. 1.

The low contrast display portion and the high contrast display portion may be arranged as shown in FIG. 4. In FIG. 4, a one-phase G.H. liquid crystal plate 5 is used for the low contrast display portion (located within the visual field frame) while a two-phase G.H. liquid crystal 5 and 5' is used for the high contrast display portion (located outside the visual field frame). This arrangement offers the same advantageous effect as that in FIG. 1 without using any polarizing plate.

Figure 5:
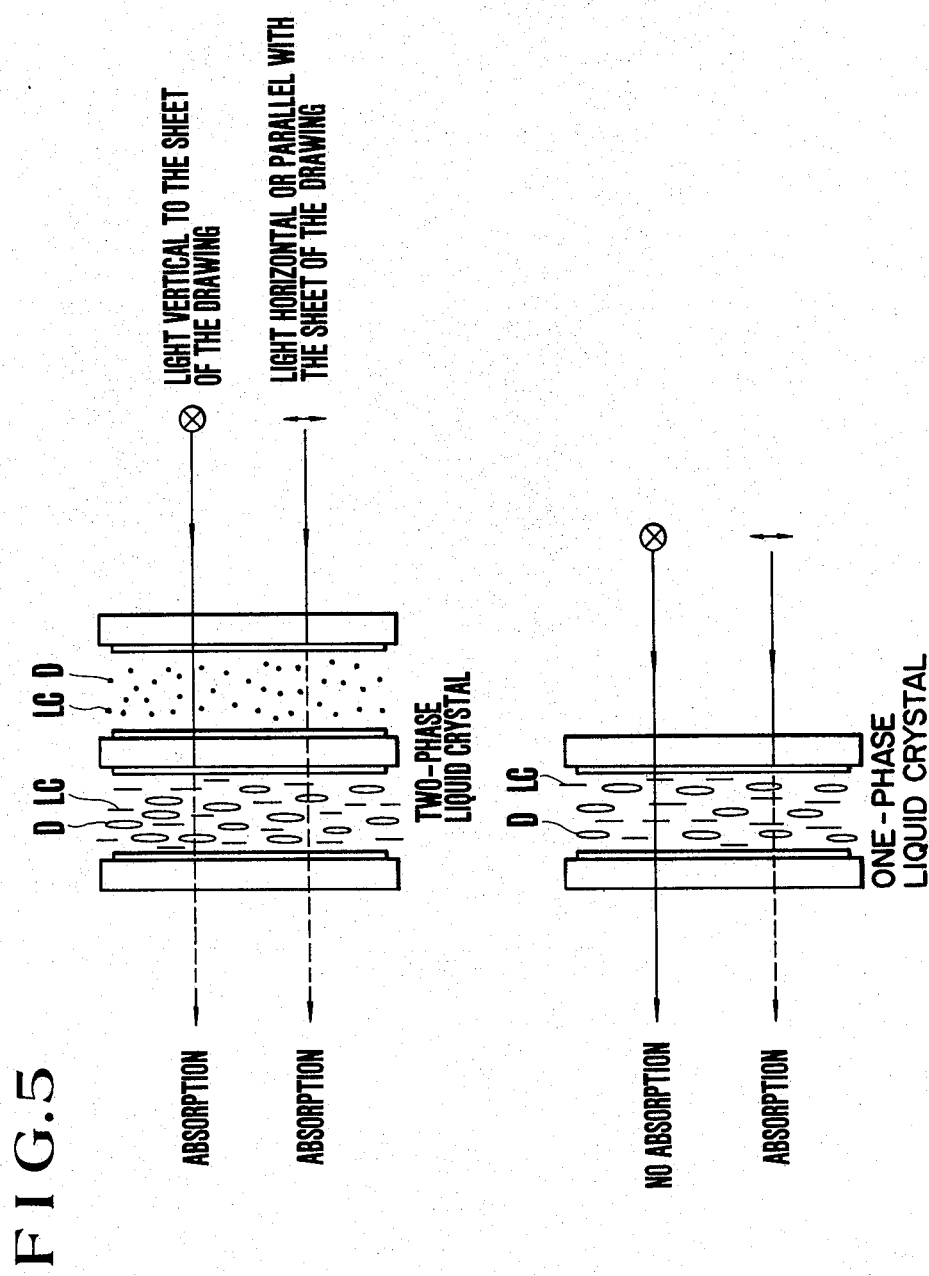
FIG. 5 is an enlarged sectional view showing one-phase and two-phase G.H. liquid crystals to be used for the display device of FIGS. 1 and 4.

The one-phase G.H. liquid crystal plate and the two-phase G.H. liquid crystal plate mentioned above are constituted as shown in FIG. 5. In FIG. 5, a reference symbol LC indicates the molecules of liquid crystal; and D indicates dyestuff molecules. In the case of the two-phase 9A liquid crystal, these molecules are arranged in two different phases differing 90° from each other. In the case of the two-phase arrangement, therefore, absorption occurs for both light polarized perpendicularly to the sheet of the drawings and a light polarized horizontally in parallel with the sheet of the drawing so that the display can have a high degree of contrast. In the one-phase 9A liquid crystal on the other hand, one of the vertically and horizontally polarized lights passed therethrough without being absorbed and produces a low contrast.

Further, it goes without saying that the high contrast display portion and the low contrast display portion are also obtainable by using the liquid crystal of the T.N. type and by varying the polarizing degree of the polarizing plate.

Figure 6:
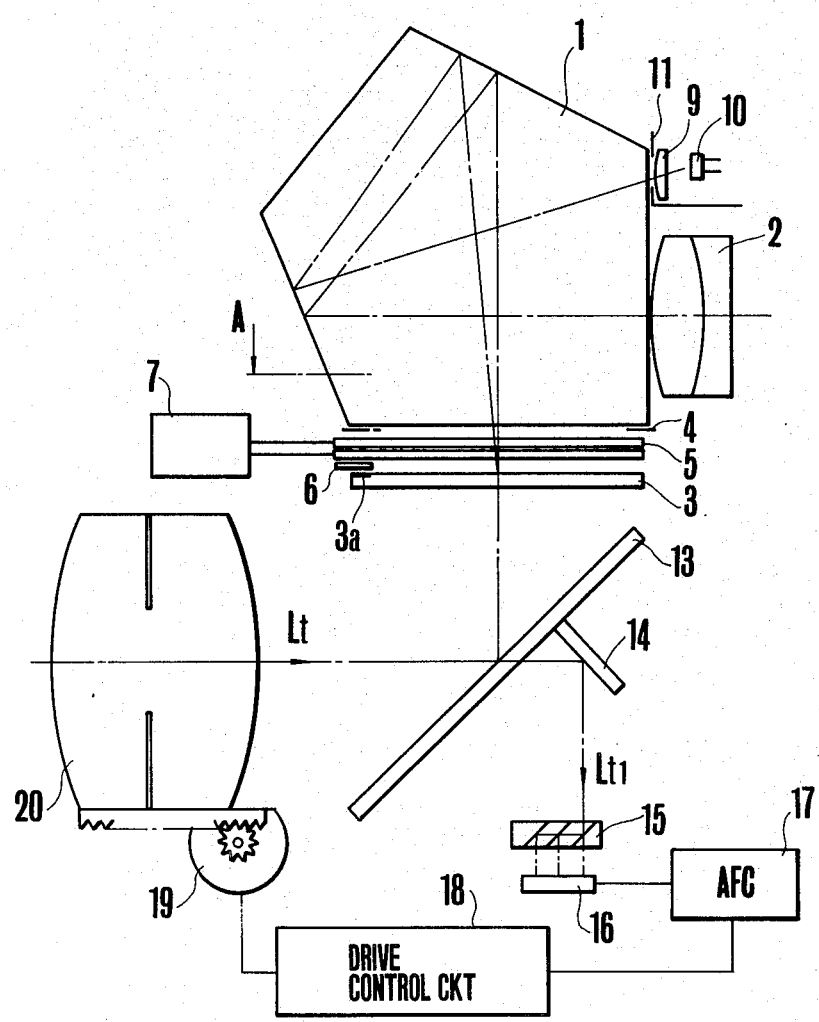
FIG. 6 is a schematic view of a camera having the display device of FIG. 1, disposed within the view finder thereof.

FIG. 6 shows the whole structural arrangement of the camera equipped with the device for a display within the view finder shown in FIG. 1. Parts that are identical to those shown in FIG. 1 are indicated with the same reference numerals and are omitted from detailed description below: The camera comprises a light measuring lens 9 disposed above the eye-piece; a light measuring element 10 which measures the light flux coming from the light measuring lens 9; and a light measuring mask 11 which is interposed in between the light measuring lens 9 and the penta-prism 1. In the view finder optical system arranged in the camera, a liquid crystal plate 5 is interposed as a photo-electric light shielding member in between the reticle 3 and the penta-prism 1. However, the invention is not limited to this arrangement and the reticle 3 may be disposed between the penta-prism 1 and the photo-electric light shielding member 5. The camera further comprises a 45° reflecting mirror 13 which is disposed below the reticle 3 and has the middle portion thereof arranged into a half-mirror, so that a part of light flux Lt coming from an object to be photographed through a photo-taking lens 20 can be guided upward toward the view finder optical system while another part of the light flux Lt is guided downward through a sub-mirror 14 toward an automatic focusing (AF) optical system. A split prism 15 is disposed below the mirror 13 and is arranged for the purpose of automatic focusing (AF). Below the prism 15 is disposed an AF sensor 16 which, in this particular embodiment, is a CCD (charge coupled device) sensor 16. A computing processing circuit 17 is connected to the sensor 16 for automatic focusing. To this circuit 17 is connected a motor drive control circuit 18 which arranged to drive and control motor 19 for driving the photo-taking lens 20 in response to a control signal received from the computing processing circuit 17.

The light flux Lt from the sub-mirror 14 is divided into three parts by the AF split prism 15. The split parts of the light flux thus obtained give near-focus, in-focus and far-focus signals respectively in accordance with a focusing process carried out by contrast detection. Since the arrangement relative to automatic focusing is in accordance with the known technique, the details of the arrangement is omitted herein. It goes without saying that each of other known automatic focusing processes to be carried out by detecting a deviation, by ultrasonic detection, etc. are also compatible with the invention.

Figure 7:
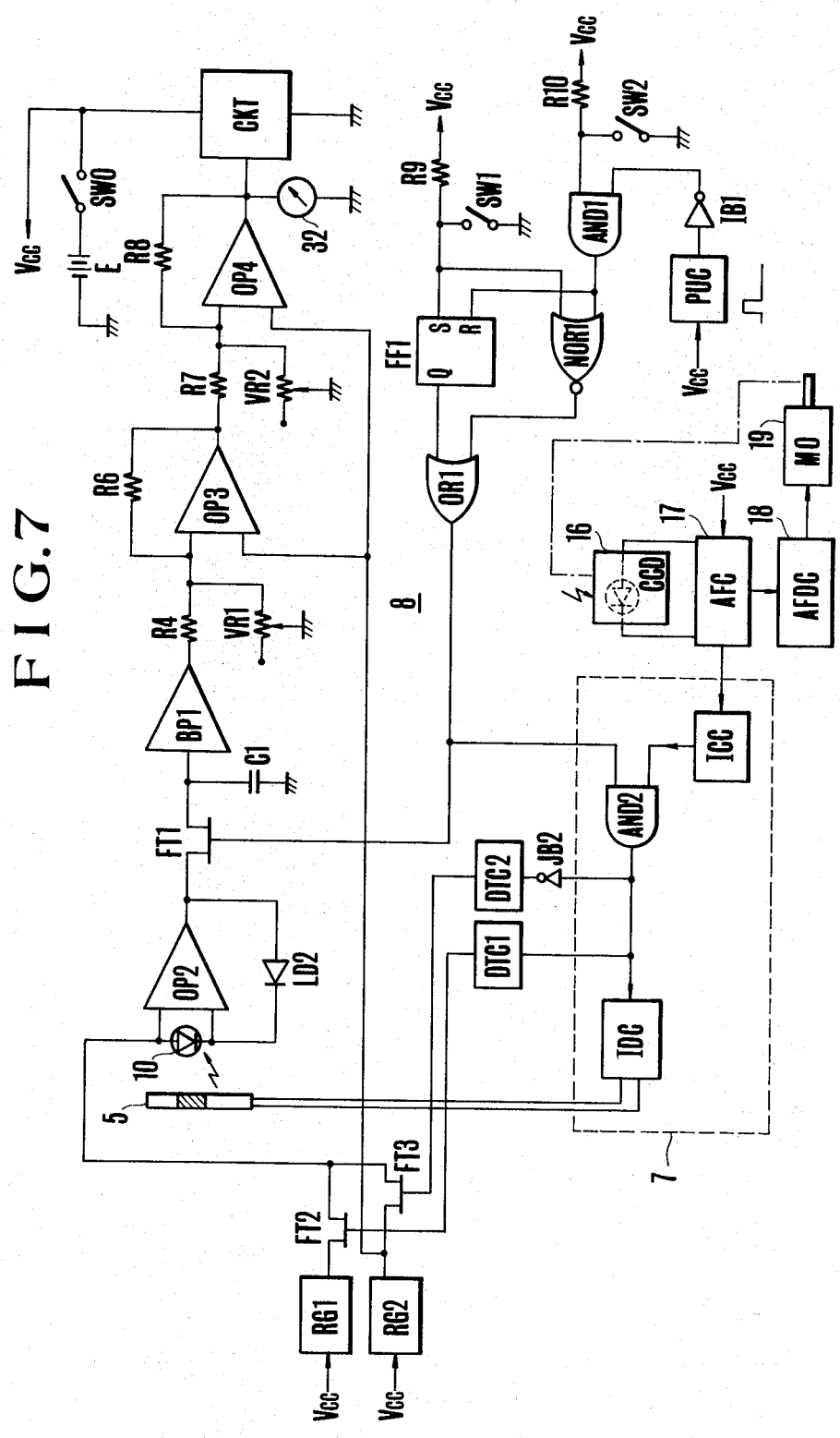
FIG. 7 is a circuit diagram showing the control circuit of the of FIG. 6.

FIG. 7 shows the control circuit arrangement of the camera shown in FIG. 6. FIG. 7 includes the liquid crystal plate serving as the light shielding element, the light measuring element 10, the AF sensor 16, the computing processing circuit 17 for AF, the motor drive circuit 18 and the motor 19 which is shown in FIG. 6. A reference numeral 7 indicates the driving circuit which is shown in FIGS. 1 and 5 while a numeral 8 indicates the detection, computation and control circuits shown in FIG. 1. In the arrangement shown in FIG. 7, an operational amplifier OP2 has the light measuring element 10 connected between its input terminals. Meanwhile, a diode LD2 for logarithmic suppression is connection between the input and output terminals of the operational amplifier OP2. The output of the operational amplifier OP2 is applied to a buffer amplifier BP1 through an analog gate FT1. A symbol C1 indicates a storage capacitor. The output of the buffer amplifier BP1 is applied to an operational amplifier OP3 through a resistor R4. A feedback resistor R6 is connected between the input and output terminals of this operation amplifier OP3. A variable resistor VR1 for setting photographic information is connected to the operational amplifier OP3. The output of the operational amplifier OP3 is applied to another operation amplifier OP4 through a resistor R7. Between the input and output terminals of this operational amplifier OP4 is connected a feedback resistor R8. A variable resistor VR2 is connected to the operational amplifier OP4 for the purpose of setting photographic information. A number 32 indicates a meter. An exposure control circuit CKT is arranged either to control shutter time or to control aperture values A power source is in the form of a battery E, a power source switch SWo is arranged to be closed at a first step of the stroke of a release button. An AC pulse voltage generator IDC is arranged for driving the display by the liquid crystal plate 5. A display control circuit ICC is arranged to supply signals to the AC pulse voltage generator circuit IDC through an AND gate AND2. The signals from the display control circuit ICC are arranged such that, when displaying with the light shielding action of the liquid crystal, a signal "H" is produced to display an out-of-focus condition and, in putting out the display by releasing the liquid crystal from the light shielding action, i.e. at the time of an in-focus condition, a signal "L" is produced by the circuit ICC. The automatic focusing (AF) computer processing circuit 17 is arranged to provide the AF motor driving circuit 18 with information about a near-focus, far-focus, or in-focus condition. The circuit 17 is also arranged to provide the display control circuit ICC with information representative of an in-focus or out-of-focus condition. The motor 19 is arranged to drive the photo-taking lens for an automatic focusing operation. A symbol FF1 indicates a flip-flop. A release switch SW1 is arranged to be turned on by a second step in the stroke during depression of the release button. A timing switch SW2 is arranged, for example, to turn off when a film is wound up and turns on upon completion of travel of a trailing curtain of the shutter. A power up clear circuit PUC produces a short pulse at the build up time of the power source after the switch SWo is turned on. The output of the power up clear circuit PUC is applied to the reset terminal R of the flip-flop circuit FF1 through an inverter IB1 and an AND gate AND1. The output of the AND gate AND1 passes to the analog gate FT1 and the AND gate AND2 through a NOR gate NOR1 and an OR gate OR1. A connection point between the switch SW1 and a resistor R9 is connected to the set terminal S of the flip-flop circuit FF1 and the output terminal of the NOR gate NOR1. A connection point between the switch SW2 and a resistor R10 is connected to the input terminal of the AND gate AND1. Constant voltage sources RG1 and RG2 produce reference voltages. The constant voltage sources are provided in two kinds of adjustment of the level of the operational amplifier OP2. The voltage sources RG1 and RG2 are thus connected to the input terminals of the operational amplifier OP2 through analog gates FT2 and FT3 respectively. The circuit arrangement further includes delay circuits DTC1 and DTC2 which are arranged to compensate the response speed of the liquid crystal for timing adjustment. The output of the AND gate AND2 is applied to the analog gate FT2 through the delay circuit DTC1 while the output of the AND gate AND1 is applied to the analog gate FT3 through an inverter IB2 and the delay circuit DTC2. In the condition shown in FIG. 2(a), the liquid crystal plate 10 performs a partial light shielding action to bring about a display (at the time of an out-of-focus condition), and the constant voltage source RG1 acts on the operational amplifier OP2. Using APEX values the system operates as follows: Assuming that the value of the brightness of an object to be photographed is Bv, the value of the maximum F value of the photo-taking lens is Avo, the value of the curvature of the photo-taking lens is Avc, and the value of the extent of light shielding effected by the liquid crystal plate 5 is Iv, the output information of the operational amplifier OP2 can be expressed by: Bv−Avo−Avc−Iv+(RG1).

Figure 2B:
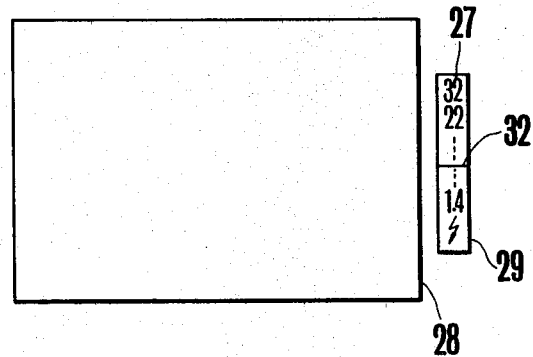
FIG. 2(b) shows it as in another state representing an in-focus condition.

Under the conditions of FIG. 2(b), that is, when the partial light shielding action is not performed by the liquid crystal plate 5 (during an in-focus condition), the constant voltage source RG2 acts on the operational amplifier OP2. Accordingly, the output information of the operational amplifier OP2 can be expressed by:

Bv−Avo−Avc+(RG2). The constant voltage sources RG1 and RG2 for producing reference voltages are arranged so that to each other as expressed by) (RG2)=(RG1)−Iv. With this relation established between them, the output level of the operational amplifier OP2 can be kept unvarying whenever light measurement is performed on the diffusion surface of the same brightness.

The arrangement which has been described above operates in the following manner: When the release button of the camera (not shown) is depressed, the switch SWo is turned on at the first step of the depressing operation. With the switch SWo thus turned on, power supply begins to the distance measuring, light measuring and display circuits. The power up clear circuit PUC then produces a single pulse. With the pulse produced, an input to the reset terminal R of the flip-flop circuit FF1 becomes a low level once through the inverter IB1 and the AND gate AND1 as shown in FIG. 8. Therefore, the output terminal Q of the flip-flop circuit FF1 is kept high. Accordingly, the level of the output of the OR gate OR1 becomes high to supply a high signal to the analog gate FT1 and the AND gate AND2.

Meanwhile the distance measuring circuit is also activated to activate the computer processing circuit 17 for AF. Then, in an out-of-focus condition, the photo-taking lens driving motor 19 is driven in the in-focus direction by the driving circuit 18 (with feedback control). Concurrently, the computer processing circuit 17 supplies the display control circuit ICC with information representative of the out-of-focus condition. This causes the level of the output of the display control circuit ICC to become high. Accordingly, the level of the output of the OR gage OR1 becomes high to cause the level of the output of the AND gate AND2 to go high. The driving circuit IDC then receives a high level input. The driving circuit IDC operates to supply the liquid crystal plate 5 with liquid crystal driving AC pulses. This results in a display as shown in FIG. 2(a) to inform the photographer of the out-of-focus condition.

The high level output of the AND gate AND2 turns on the analog gate FT2 through the delay circuit DTC1. Meanwhile, since the analog gate FT3 is arranged to have its input through the inverter IB2, a low level signal is supplied to the analog gate FT3 to keep it off. The delay circuits DTC1 and DTC2 are used for the purpose of synchronization with the liquid crystal plate 5 because of the response delay of the liquid crystal. Further, the liquid crystal is such that its response speed varies with temperature. It is therefore possible that this variation with temperature might make synchronization difficult with the timing of the level adjustment of the operational amplifier OP2 between a condition obtaining at the time of the light shielding action by the liquid crystal plate 5 (a display condition) and another condition prevailing during no light shielding action by the liquid crystal plate 5 (a non-display condition). To solve this problem, the delay circuits DTC1 and DTC2 are arranged to permit synchronization by detecting the temperature condition and by varying their delay time in accordance with the detected temperature. At the time of the out-of-focus condition, the voltage of the constant voltage source RG1 is applied to the operational amplifier OP2. Therefore, the level of the output of the operational amplifier OP2 is determined by the constant voltage source RG1.

With the liquid crystal plate 5 as shown in FIG. 2(a) light from the object to be photographed causes the light measurement element 10 to produce a photo-electric current. This current is logarithmically suppressed at the operational amplifier OP2 which is provided with a diode LD2 of logarithmic characteristic and thus appears in the output of the amplifier OP2. The output of the operational amplifier OP2 is stored at the capacitor C1 through the analog gate FT1 which is on. Since the voltage of the constant voltage source RG1 has been applied to the operational amplifier OP2, the output level is determined by the constant voltage source RG1. (As mentioned in the foregoing, the relation of the constant voltage source RG2 is such that the level of the above stated output remains unvarying with light measurement performed on the diffusion surface of the same brightness irrespective as to whether the light measurement is performed in the condition of FIG. 2(a) or the condition of FIG. 2(b).)

Such being the output level, information thereon is omitted here. Meanwhile, description by computed APEX values is as follows: The stored information is obtained from the maximum F value information Avo and computed information (Bv− Avo−Avc) of the full-open curvature information Avc of the lens. The information (Bv−Avo−Avc) is supplied to the operational amplifier OP3 through the buffer amplifier BP1 and the resistor R4.

In accordance with setting at the variable resistor VR1, the information of Avo and Avc, for example, is supplied to the operational amplifier OP4 through the operational amplifier OP3. The operational amplifier OP4 receives the photographic information, such as shutter time information Tv and film sensitivity information Sv, which is set at the variable resistor VR2. The output of the operational amplifier OP3 thus represents (Bv−Avo−Avc)+Avc+Avo+Sv−Tv=Av. The output of the operational amplifier OP4 is supplied also to the control circuit CKT while it is displayed within the view finder by the exposure indication meter 32 which is shown in FIGS. 2(a) and 2(b).

Meanwhile, with the distance measuring circuit operated, the driving action of the driving motor 19 on the photo-taking lens is controlled by the AF computing processing circuit 17 and the driving circuit 18 to bring the photo-taking lens to a stop in an in-focus position. Then, an in-focus signal is supplied from the processing circuit 17 to the display control circuit ICC. This causes the level of the output of the display control circuit ICC to go low. Accordingly, the level of the output of the AND gate AND2 also becomes low to apply a low input to the voltage generator IDC. The AC pulse output then comes to a stop to release the liquid crystal plate 5 from its light shielding action. Therefore, the display within the visual field of the view finder disappears to show an in-focus condition. Then, since the level of the input to the analog gate FT2 is made low through the delay circuit DTC1, the gate FT2 turns off. Because another analog gate FT3 is controlled through the inverter IB2, a high level signal is supplied to the analog gate FT3 to turn it on. The voltage level of the operational amplifier OP2 is then determined by the constant voltage source BG2. The switch-over between the analog gates FT2 and FT3 in relation to the liquid crystal permits synchronization by means of the delay circuits DTC1 and DTC2 despite of the response delay of the liquid crystal as mentioned in the foregoing.

Although the light shielding portion of the liquid crystal has disappeared to increase the quantity of light received, as mentioned above, the level of the output of the operational amplifier OP2 is kept unvaried by the switch-over of the source of the reference voltage of the operational amplifier OP2 from the constant voltage source RG1 to the other constant voltage source RG2. After that, exposure computation is carried out in the same manner as shown in FIG. 2(a).

Next, when the switch SW1 is turned on at the second step in the depressing operation of the release button as shown in FIG. 8, the level of the set input terminal S of the flip-flop circuit FF1 goes low. Since the switch SW2 is still off then, the output terminal Q of the flip-flop circuit FF1 is latched at a low level. Therefore, the level of the output of the OR gate OR1 becomes low. This turns off the analog gate FTL and light measurement information (Bv−Avo−Avc) is stored and kept at the capacitor C1. Then, since the output of the AND gate AND2 is kept low by the display control circuit ICC at that time, no change-over occurs between the analog gates FT2 and FT3. Of the light measurement information (Bv−Avo−Avc), the values Avo and Avc are obtained from the setting of the variable resistor VR1 through the buffer amplifier BP1 and the light measurement information is supplied to the operational amplifier OP4 through the operational amplifier OP3. The amplifier OP4 also receives photographic information set at the variable resistor VR2, such as shutter time information Tv, and film sensitivity information. These data inputs are computed at the operationed amplifier OP4 to give a information output (Bv−Avo−Avc)+Avc+Avo+Sv−Tv=Av. The control circuit CKT performs control actions according to this information output Av to achieve a correct exposure.

With a series of exposure control actions carried out by the control circuit CKT, the switch SW2 turns on after completion of a shutter operation. With the switch SW2 turned on, the level of the reset input terminal R of the flip-flop FF1 becomes low. Then, if the switch SW1 is off, the input terminal S of the flip-flop FF1 is high and the level of the Q output thereof is high. The level of the output of the OR gate OR1 then also goes high. Therefore, while the switch SWo is on, the distance measuring and light measuring actions again begin in the same manner as in the foregoing. Further, when the switch SW1 is on, the level of the set input terminal S of the flip-flop goes low to make the flip-flop FF1 unstable. However, since the level of the output of the OR gate OR1 is made high by the NOR gate NOR1, the same result as that described in the foregoing prevails.

As described in detail in the foregoing, in accordance with the invention, the use of the liquid crystal plate simultaneously offers a high contrasting display portion and a low contrasting display portion within the view finder. Therefore, the view finder display arrangement according to the invention is suitable particularly for a single-lens reflex camera.

The invented arrangement of switching over the light measuring reference level according to the condition of the information display by using the photo-electric light shielding element, permits the photographer always to obtain accurate light measurement information even where the information is arranged to be displayed within the visual field of the view finder and thus enables a camera to achieve a correct exposure. Further, the invention obviates the necessity of making the display flickering. The light measuring element can be disposed in any desired position.

In the embodiment described above, a photo-electric light shielding element is used for producing an in-focus display in a TTL-AF type camera. However, it goes without saying that the invention is not limited to such arrangement and the light shielding element may be used for giving a warning against a low or high level of light measured.

What we claim:

1. A view finder display device for a camera, comprising:
   a photo-taking lens;
   a reflecting mirror which reflects light from said photo-taking lens;
   a penta-prism for having light reflected from said reflecting mirror incident thereon, said penta-prism being arranged to project visible light;
   a visual field frame disposed below said penta-prism, said visual field frame forming an aperture for a photographic visual field and an aperture for an information display;
   a liquid crystal plate disposed below said penta-prism for forming a pattern to be displayed within the visual field and an information display pattern;
   said liquid crystal plate being of the guest-host type;
   a polarizing plate arranged to correspond only to the information display pattern of said liquid crystal plate; and
   said polarizing plate forming a visual contrast difference between the display pattern within the visual field and the information display pattern.

2. A view finder display device for a camera, comprising:
   a photo-taking lens;
   a reflecting mirror which reflects light from said photo-taking lens;
   a penta-prism located to have reflected light from said reflecting mirror incident thereon, said penta-prism being arranged to project visible light therefrom;
   a visual field frame disposed below said penta-prism, said visual field frame forming an aperture for a photographic visual field and another aperture for an information display; and
   liquid crystal plate means disposed below said penta-prism, for forming a pattern to be displayed within the visual field and an information display pattern, said plate means includes a one-phase guest-host type liquid crystal plate located in a position corresponding to said aperture for the photographic visual field and a two-phase guest-host type liquid crystal plate located in a position corresponding to said aperture for the information display.

3. A single-lens reflex camera comprising:
   a photo-taking lens;
   a reflecting mirror for reflecting light from said photo-taking lens;
   a penta-prism arranged to have light reflected from said reflecting mirror incident thereupon, said penta-prism being arranged to project visible light therefrom;
   and changeable into and out of a shielding state;
   photo-electric light shielding means disposed below said penta-prism, said means forming a display pattern;
   light measuring means for measuring light coming from said penta-prism, and switch-over means for switching the light measurement reference level of said light measuring means between a level to be used when said light shielding means is in a light shielding state and another level to be used when the light shielding means out of the light-shielding state.

4. A device according to claim 3, wherein said switchover means is arranged such that the light measurement reference level is switched over to another level which differs as much as the degree of light shielding effected by said light shielding means.

5. A view finder display device for a camera, comprising:

a visual field frame for forming an aperture for a photographic visual field, and an aperture for an information display;

information display means for performing view finder display through said aperture for the information display;

optical means for observing an image of an object through the aperture for the photographic visual field;

as liquid crystal plate disposed adjacent to the visual field frame for forming a pattern to be displayed within the visual field and an information display pattern, said liquid crystal plate having a portion of one-phase guest-host type liquid crystal corresponding to the aperture of the photographic visual field, and a portion of two-phase guest-host type liquid crystal corresponding to the aperture for the information display.

* * * * *